Aug. 2, 1966

E. W. KONRAD 3,263,524

HYDROKINETIC TORQUE CONVERTER TRANSMISSION
WITH STATOR REVERSE DRIVE

Filed July 22, 1963

INVENTOR:
EUGENE W. KONRAD
BY
ATTORNEYS

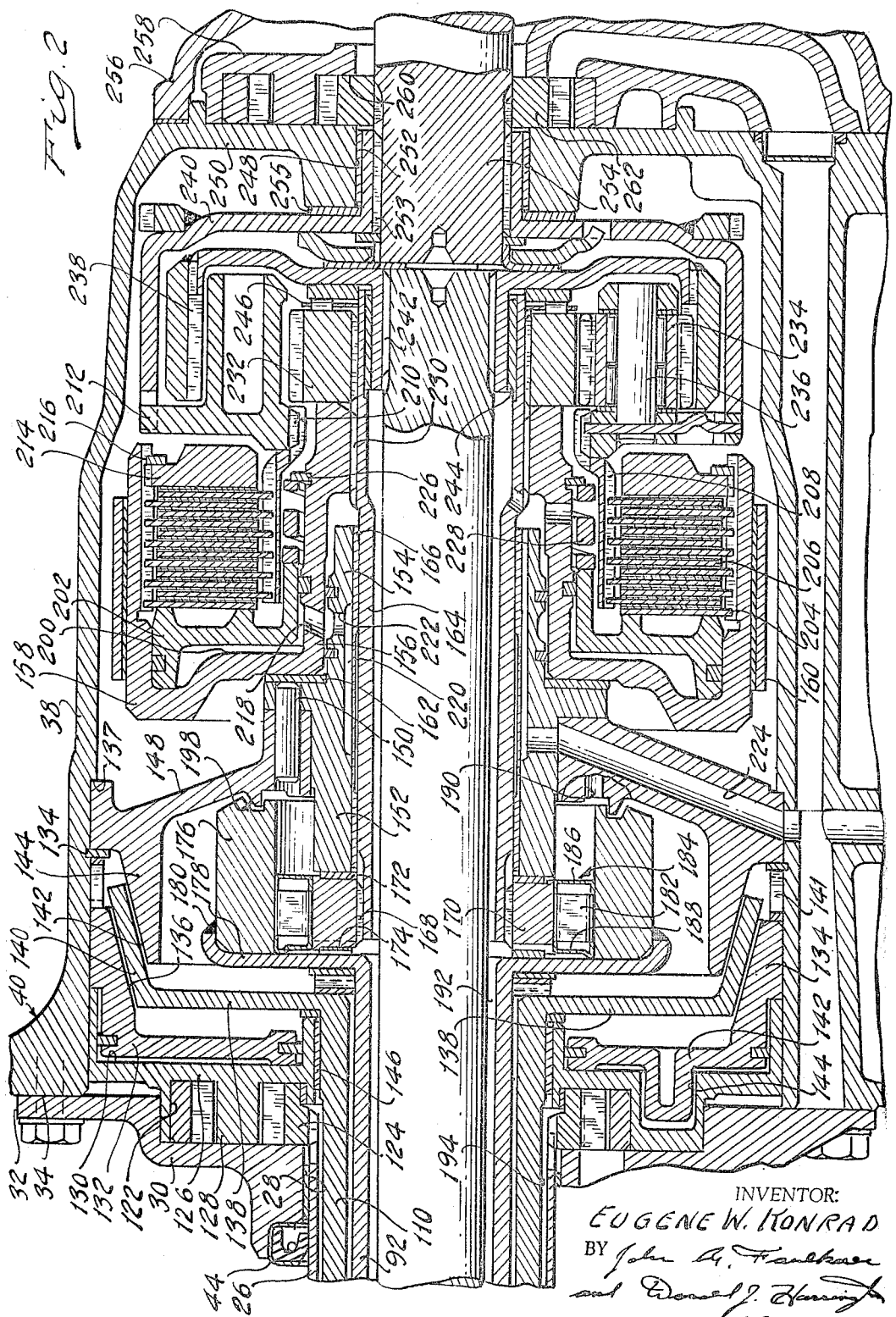

United States Patent Office 3,263,524
Patented August 2, 1966

3,263,524
HYDROKINETIC TORQUE CONVERTER TRANSMISSION WITH STATOR REVERSE DRIVE
Eugene W. Konrad, Northville, Mich., assignor to Ford Motor Company, Dearborn, Mich., a corporation of Delaware
Filed July 22, 1963, Ser. No. 296,658
6 Claims. (Cl. 74—677)

My invention relates generally to improvements in hydrokinetic power transmission mechanisms, and more particularly to an automotive vehicle power transmission mechanism having a hydrokinetic torque converter unit and a simple planetary gear unit acting in combination, the gear unit functioning to provide a speed reduction ratio and a relatively high speed cruising ratio. I contemplate that reverse drive may be obtained in my improved mechanism without the use of a separate reverse driving gear arrangement.

The provision of a power transmission mechanism of the type above set forth being a principal object of my invention, it is a further object of my invention to provide a hydrokinetic torque converter transmission mechanism having multiple bladed members, one of the members functioning both as a turbo-stator that is capable of causing an augmentation in the torque ratio of the hydrokinetic unit during forward drive operation in the torque conversion range and as a reverse driving turbine during reverse drive operation.

It is a further object of my invention to provide a mechanism of the type above set forth wherein improved overrunning brake means are employed for anchoring the turbo-stator during forward drive operation in the torque conversion range to inhibit backward rotation of the turbo-stator relative to the rotation of the impeller and for accommodating free-wheeling motion thereof in the direction of the rotation of the impeller during operation in the cruising range.

It is a further object of my invention to provide a mechanism having an improved overrunning brake structure of the type above set forth wherein provision is made for adapting it to function as a part of a torque delivery path between a driving member and a power input element of the gear unit during reverse drive operation.

For the purpose of describing more particularly the improvements of my invention, reference will be made to the accompanying drawings wherein:

FIGURE 2 shows an assembly view of a simple planetary gear unit and a clutch and brake arrangement capable of being used with the mechanism of FIGURE 1.

Figure 1:
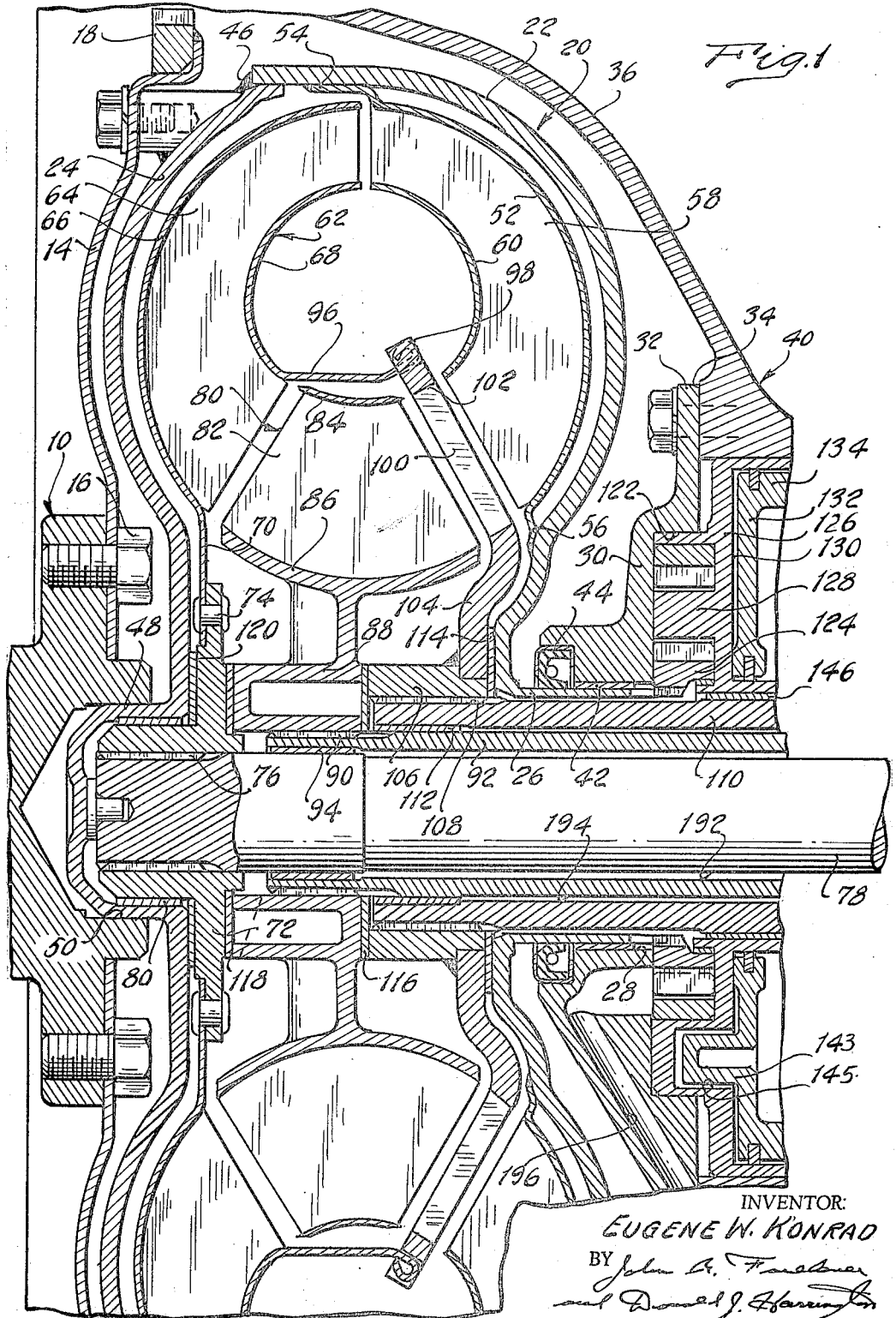
FIGURE 1 shows a torque converter mechanism that forms a portion of my improved transmission assembly.

Referring first to FIGURE 1, numeral 10 designates a crankshaft of an internal combustion vehicle engine. It is flanged at 12 to provide a positive connection with the hub of a drive plate 14, suitable bolts 16 being provided to establish the connection. The periphery of the drive plate 14 carries a vehicle engine starter ring gear 18.

The transmission mechanism includes a hydrokinetic torque converter unit 20 which comprises an impeller shell having a first shell part 22 and a second shell part 24. Each shell part is formed in the shape of a torus to conform with the shape of the impeller and turbine members.

The hub of shell part 22 is connected to or formed integrally with a sleeve shaft 26 which extends within a bearing opening 28 formed in a separator wall 30. This wall is secured at its periphery 32 to a shoulder 34 formed at the juncture of a converter housing part 36 and a main housing part 38. The housing parts 36 and 38 form an integral housing of cast construction that is designated generally by reference character 40.

A bushing 42 is received within the opening 28 for piloting the shaft 26. A suitable fluid seal 44 can be provided between the shaft 26 and the wall 30.

The outer periphery of the shell part 22 is welded at 46 to the outer periphery of the shell part 24. The hub portion 48 of shell part 24 is received within a pilot opening 50 formed in the end of the crankshaft 10.

Secured to the inner surface of the shell part 22 is an outer impeller shroud 52. It is secured to the inner surface of part 22 at a radially outward region, as shown at 54, and also at a radially inward region as shown at 56.

Connected to the shroud 52 is a series of impeller blades 58. An impeller shroud 60 is secured to the inner margins of the blades 58. The shrouds 52 and 60 cooperate with the blades 58 to define radial outflow passages in the usual fashion.

A turbine is designated generally by reference character 62. It includes turbine blades 64, an outer turbine shroud 66 and an inner turbine shroud 68. The outer margins of the blades 64 are secured to the shroud 66 and the inner margins thereof are secured to the shroud 62. The shrouds cooperate with the blades 64 to define radial inflow passages in the usual fashion. The radially outward flow inlet region of the turbine 62 is situated directly adjacent the radially outward flow exit region of the impeller.

The radially inward periphery 70 of the shroud 66 is secured to a hub 72, suitable rivets 74 being provided for this purpose. Hub 72 in turn is splined at 76 to a centrally disposed turbine shaft 78.

A bushing 80 is situated between the hub 72 and the hub portion 48 of the shell part 24.

Located between the flow exit region of the turbine 62 and the flow entrance region of the impeller is a stator 80. It includes stator blades 82 situated between a first shroud 84 and a second shroud 86. The blades 82 function in the usual fashion to change the direction of the fluid flow that leaves the exit region of the turbine before it enters the entrance region of the impeller.

Shroud 86 is connected directly to a stator hub 88 which in turn is splined at 90 to a stator sleeve shaft 92.

Shaft 92 is journaled by means of a bushing 94 upon the central turbine shaft 78.

The turbine shroud 68 is formed with an extension 96 which is mechanically locked at 98 to a torque transfer member 100. A radially extending portion of the member 100 extends through the torus circuit of the hydrokinetic unit. Apertures 102 in member 100 prevent resistance to the fluid flow passing through the circuit.

The radially inward portion 104 of the member 100 is welded to a hub 106 which in turn is splined at 108 to a sleeve shaft 110. This shaft in turn extends concentrically over the shaft 92 and through the opening 28 formed in the wall 30. A suitable bushing 112 is provided between shaft 110 and shaft 92.

A thrust washer 114 is disposed between a portion 104 and the radially inward portion of shell part 22. Another thrust washer 116 is situated between the hub 88 of the stator and hub 106 of the member 100. Thrust washers are provided also on either side of the hub 72, as shown at 118 and 120.

Wall 30 defines a pump chamber 122. Situated within this pump chamber are positive displacement pump gear elements 124. The driving portion of the elements 124 is keyed to shaft 26 so that the pump can be operated whenever the engine is in operation. A pump closure plate, shown at 126, is formed with a crescent 128 which is disposed between the space between the gear elements in a convention fashion.

Closure plate 126 is secured to the housing portion 38. It defines an annular cylinder 130 within which is situated an annular piston 132. Carried by the piston 132 is a reverse cone brake friction element 134 having a cone friction surface 136.

Sleeve shaft 110 is secured to a radially extending portion 138 which has secured thereto a cone brake element 140. This element is situated between surface 136 and a second friction cone surface 142 carried by a cone brake element 144. This element in turn is anchored to the inner surface of the housing part 138 by bolts or by any other suitable connection. It is held axially fast by a snap ring 134 and by a cooperating shoulder 137 formed on the housing portion 38. A piston return spring 141 can be provided between the snap ring 134 and the end of the piston 132.

The piston 132 can be provided with a projection 143 that is received within a cooperating opening 145 formed in the wall 30. This prevents relative rotation of the piston 132 with respect to the housing 40.

A bushing 146 can be provided between shaft 110 and the closure plate 126 to provide support for the shaft 110. Cone brake element 144 is carried by a web support 148, the inner periphery of which is connected by means of pins 150 to an overrunning brake race 152. This race is in the form of a sleeve having an extension 154 upon which is journaled the hub 156 of a brake drum 158. A friction brake band 160 encircles the drum 158. A thrust washer 162 is provided between the drum 158 and the race 152.

A sun gear sleeve shaft 164 is disposed concentrically within extension 154. It is journaled upon extension 154 by a sleeve bushing 166. The end of shaft 164 is splined at 168 to an overrunning brake race 170. Thrust washers are situated on either side of the race 170, as shown at 172 and 174.

An overrunning brake outer race is shown at 176. It is formed with a sufficient axial width so that it surrounds both of the races 170 and 152.

Race 176 is connected to radially outward flange 178 carried by sleeve 92. This connection can be established by welding 180.

Disposed between the race 176 and the paired races 152 and 170 are overrunning brake elements 182 which, by preference, are in the form of caged sprags. The elements 182 are connected together to form a unitary assembly by means of a cage 184. The cage includes two annular portions 186 and 188 situated on either side of the elements 182, which establish a sealing action between the inner surface of the race 176 and the outer surfaces of the races 170 and 152. The assembly which comprises the elements 182 and the portions 176 and 188 thus defines an annular piston and the concentric races define an annular cylinder. Fluid pressure may be admitted into the annular space on the right-hand side of the elements 182 through a pressure feed passage 190 formed in support 148. The annular space on the opposite side of the elements 182 is in fluid communication with annular pressure passage 192 defined by the concentric shafts 78 and 92. This passage functions as a converter circuit flow return passage and communicates with the cavity between the flow exit region of the turbine and the flow entrance region of the stator.

Fluid is supplied to the torus circuit of the converter through the annular space between the member 100 and the flow entrance region of the impeller blades. This space is in fluid communication with an annular flow passage 194 defined by the sleeve shaft 26 and the shaft 110. It communicates also with the high pressure side of the converter feed passage shown in part at 196. This passage in turn is formed in the wall 30.

The engine driven pump, of which elements 12 form a part, supplies fluid pressure to a control valve system that in turn regulates the flow of pressure to the passage 196.

By appropriately controlling the pressure in passage 190, the axial position of the overrunning brake elements 182 can be controlled. If passage 190 is exhausted, circuit pressure within the hydrokinetic unit will urge the elements 182 in a right-hand direction so that a one-way coupling action will be established between race 176 and race 152. On the other hand, if passage 190 is pressurized with a pressure that exceeds the static pressure in the circuit of the hydrokinetic torque converter unit, elements 182 will be shifted in a left-hand direction to establish a one-way coupling action between race 176 and race 170. Race 176 and the web support 148 are formed with a labyrinth seal 198 which makes it possible to pressurize the annular space on the right-hand side of the elements 182.

Brake drum 158 defines an annular cylinder 200 within which is situated an annular piston 202. The cylinder 200 and the piston 202 cooperate to define an annular pressure cavity.

The inner periphery of the drum 158 is internally splined to permit a splined connection with externally splined clutch discs 204. These discs are situated in interdigital relationship with respect to internally splined clutch disc 206. Disc 206 is carried by an externally splined clutch element 208 which in turn is keyed or splined at 210 to a planetary gear carrier 212.

A clutch pressure back-up plate 214 also is splined to the drum 160 and held axially fast by means of a snap ring 260.

Piston 202 is capable of urging the clutch discs 204 and 206 into frictional driving engagement as the chamber defined by the piston 202 and cylinder 200 is pressurized. Pressure can be admitted to this chamber through a port 218 which in turn communicates with an annular groove 220 formed in the extension 154, a suitable port 222 being provided for this purpose. Groove 220, in turn, communicates with a clutch pressure feed passage 224 formed in the support 148. This passage also may form a part of the automatic control valve system, not shown.

Brake band 160 can be applied and released in the conventional fashion by a suitable fluid pressure operated servo that forms a part of the automatic control valve system.

The hub 156 of the drum 158 carries a snap ring 226 which forms a seat for a piston return spring 228. This spring acts against the piston 202 to disengage the clutch when the pressure behind the piston 202 is exhausted.

Extension 156 of the drum 158 is splined at 230 to sun gear shaft 164. A sun gear 232 also is splined to shaft 164 and it engages planet pinion gears 234 which in turn mesh with a ring gear 238. Pinion gears 234 are supported upon pinion shafts 236 which in turn form a part of the carrier 212.

A torque transfer member 240 surrounds the ring gear 238 and is keyed or otherwise positively connected to carrier 212. Carrier 212 in turn is splined at 242 to the shaft 78 and rotatably supported upon shaft 164 by means of a bushing 244. A thrust bearing 246 can be provided between the sun gear 232 and the carrier.

Torque transfer member 240 is supported within an opening 248 formed in a transmission housing end wall 250, a suitable bushing 252 being provided for this purpose. A thrust washer 255 is situated between the torque transfer member 240 and the wall 250. Torque transfer member 240 is splined at 253 to a power output tailshaft 254 which in turn may be connected to the vehicle traction wheels through a suitable driveline. A tailshaft extension housing 256 may be bolted or otherwise secured to the end wall 250.

A pump housing 258 also can be secured to the wall 250. It defines a pump cavity 260 which contains positive displacement pump gear elements 262 which in turn may be keyed or splined to the power output shaft 254. This pump, together with the engine driven pump, forms a pressure source for the automatic control valve system.

The transmission structure described in the foregoing paragraphs is capable of providing two forward drive speed ratios and a single reverse drive speed ratio. To establish forward drive, low speed ratio operation, brake band 160 is anchored and the multiple clutch disc assembly is released. Sun gear 232 therefore is held stationary and is capable of functioning as a reaction member. The brake band also holds overrunning brake race 170 stationary.

The torque converter multiplies engine torque in a conventional fashion and the stator 80 functions to provide a hydrokinetic torque reaction that is distributed through sleeve shaft 92 to the race 176. The torque reaction then is transmitted through the overrunning coupling elements 182 to the stationary coupling race 152. The elements 182 are shifted in a right-hand direction during forward drive.

The multiplied turbine torque is distributed through shaft 78 to the ring gear 238. It is multiplied by the planetary gear unit and distributed from the carrier 212 through the torque transfer member 240 to the power output shaft.

To establish a high speed or direct drive ratio, it merely is necessary to disengage brake 160 and apply the multiple clutch disc assembly. This connects together sun gear 232 and the carrier thereby causing the gear unit to assume a locked-up condition. The torque that is distributed to the power output shaft 254 then is equal to the turbine torque.

To establish reverse drive operation, the multiple disc clutch assembly is released and the brake band is released.

The cone brake shown in part at 144 is applied by pressurizing the annular cylinder 130. This anchors member 100 and the turbine 62. Passage 190 is pressurized thereby causing the elements 182 to be shifted in a left-hand direction, thus establishing a driving one-way connection between race 176 and race 170.

The turbine thus functions as a stator and the stator functions as a turbine. Since the turbine is held stationary by the cone brake, ring gear 238 is capable of functioning as a reaction member. Stator torque is distributed to race 176 and is transferred through overrunning coupling elements 182 to race 170. Stator torque then is transferred to the sleeve shaft 164 to the sun gear 232. This drives the sun gear in a reverse direction and a reverse driving motion then is imparted to the carrier and the power output shaft 254. The stator torque, of course, is magnified by the planetary gear ratio.

To condition the mechanism for operation in the forward drive ranges, passage 190 is exhausted and the pressure that exists on the left hand side of the elements 182 causes them to be shifted in a right-hand direction to establish once again a one-way connection between stationary race 152 and race 176.

Having thus described a preferred embodiment of my invention, what I claim and desire to secure by United States Letters Patent is:

1. A power transmission mechanism comprising a hydrokinetic torque converter unit having an impeller, a turbine and a stator situated in toroidal fluid flow relationship, a planetary gear unit, means for drivably connecting the turbine to one element of the planetary gear unit, brake means for selectively anchoring a second element of the planetary gear unit, a third element of the planetary gear unit being connected to a driven member, clutch means for connecting two elements of said gear unit together to establish a 1:1 speed ratio therein, selectively engageable brake means for anchoring said first element during reverse drive operation, an overrunning coupling connection defining in part a first reaction torque delivery path between said stator and a stationary portion of said mechanism whereby said stator is inhibited from rotating in the direction of rotation of said impeller but capable of freewheeling in the opposite direction, and an overrunning coupling means defining in part in parallel disposition with respect to said first torque delivery path a second driving torque delivery path between said stator and said second element of said gear unit, said overrunning coupling connection and said overrunning coupling means having common overrunning coupling elements.

2. A power transmission mechanism comprising a hydrokinetic torque converter unit having an impeller, a turbine and a stator situated in toroidal fluid flow relationship, a planetary gear unit, means for drivably connecting the turbine to one element of the planetary gear unit, brake means for selectively anchoring a second element of the planetary gear unit, a third element of the planetary gear unit being connected to a driven member, clutch means for connecting two elements of the gear unit together to establish a 1:1 speed ratio therein, selectively engageable brake means for anchoring said first element during reverse drive operation, an overrunning brake means for connecting said stator to a stationary portion of said mechanism whereby said stator is inhibited from rotating in one direction but capable of freewheeling in the opposite direction, and an overrunning coupling means between said stator and said second element of said gear unit, said overrunning brake means and said overrunning coupling means having common overrunning coupling elements, said overrunning coupling means comprising an inner race and an outer race arranged concentrically with respect to each other, said overrunning brake means comprising a stationary inner race situated adjacent the inner race of said overrunning coupling means, said overrunning coupling elements being situated within said outer race and shiftable axially therein to establish alternately a one-way connection between said outer race and each of said inner races.

3. A power transmission mechanism comprising a hydrokinetic torque converter unit having an impeller, a turbine and a stator situated in toroidal fluid flow relationship, a planetary gear unit, means for drivably connecting the turbine to one element of the planetary gear unit, brake means for selectively anchoring a second element of the planetary gear unit, a third element of the planetary gear unit being connected to a driven member, clutch means for connecting two elements of the gear unit together to establish a 1:1 speed ratio therein, selectively engageable brake means for anchoring said first element during reverse drive operation, an overrunning brake means for connecting said stator to a stationary portion of said mechanism whereby said stator is inhibited from rotating in one direction but capable of freewheeling in the opposite direction, an overrunning coupling means between said stator and said second element of said gear unit, said overrunning coupling means and said overrunning brake means having common overrunning coupling means and said overrunning brake means having common overrunning coupling elements, said overrunning coupling means comprising an inner race and an outer race arranged concentrically with respect to each other, said overrunning brake means comprising a stationary inner race situated adjacent the inner race of said overrunning coupling means, said overrunning coupling elements being situated within said outer race and shiftable axially therein to establish alternately a one-way connection between said outer race and each of said inner races, said overrunning coupling elements cooperating with said races to define a pair of opposed pressure chambers on either side thereof, and means for pressurizing said chambers selectively to establish shifting movement of said overrunning coupling elements from one axial position to another.

4. An overrunning torque establishing mechanism comprising a first race and a pair of second races with equal diameters, said second races being arranged concentrically with respect to said first race, means for driving said first race, means for anchoring one of said second races, the other said second races being connected to a driven member, overrunning coupling elements disposed between said first race and said paired second inner races to establish alternately a one-way driving connection between said first race and each of said second races, said races and said overrunning coupling elements cooperating to define a pair of opposed fluid pressure chambers situated on either side of said coupling elements, and means for pressurizing said chambers selectively to establish shifting movement of said overrunning coupling elements from one of the second races to the other.

5. A hydrokinetic power transmission mechanism comprising a torque converter unit and a simple planetary gear unit, said torque converter unit comprising an impeller, a turbine and a stator situated in toroidal fluid flow relationship, said planetary gear unit having a sun gear, a ring gear, a carrier and planet gears carried by said carrier in meshing engagement with said sun and ring gears, means for drivably connecting said carrier to a driven member, means for drivably connecting said turbine to said ring gear, a pair of overrunning coupling inner races, one race being connected to a stationary portion of said mechanism and the other race being connected to said sun gear, a selectively engageable brake for anchoring said sun gear and said other inner race, clutch means for connecting together two elements of said gear unit to establish a one-to-one driving ratio therein, reverse brake means for anchoring said ring gear and said turbine during reverse drive operation, an overrunning coupling outer race surrounding said inner races, said stator being connected to said outer race, and overrunning coupling elements situated within said outer race and adapted to shift axially therein to establish alternately a one-way connection between said outer race and each of said inner races.

6. A hydrokinetic power transmission mechanism comprising a torque converter unit and a simple planetary gear unit, said torque converter unit comprising an impeller, a turbine and a stator situated in toroidal fluid flow relationship, said planetary gear unit having a sun gear, a ring gear, a carrier and planet gears carried by said carrier in meshing engagement with said sun and ring gears, means for drivably connecting said carrier to a driven member, means for drivably connecting said turbine to said ring gear, a pair of overrunning coupling inner races, one race being connected to a stationary portion of said mechanism and the other race being connected to said sun gear, a selectively engageable brake for anchoring said sun gear and said other inner race, clutch means for connecting together two elements of said gear unit to establish a one-to-one driving ratio therein, reverse brake means for anchoring said ring gear and said turbine during reverse drive operation, an overrunning coupling outer race surrounding said inner races, said stator being connected to said outer race, overrunning coupling elements situated within said outer race and adapted to shift axially therein to establish alternately a one-way connection between said outer race and each of said inner races, said races and said overrunning coupling elements cooperating to define a pair of fluid pressure chambers situated on either side of said coupling elements, and means for pressurizing said chambers selectively to establish shifting motion of said overrunning coupling elements from one axial position to another whereby a one-way coupling action between said outer race and said each of said inner races can be established selectively.

References Cited by the Examiner
UNITED STATES PATENTS

| | | | |
|---|---|---|---|
| 1,942,669 | 1/1934 | Smith | 192—48 |
| 2,414,359 | 1/1947 | Carnagua | 74—677 |
| 2,612,791 | 9/1952 | Miller | 74—767 |

DAVID J. WILLIAMOWSKY, *Primary Examiner.*

J. R. BENEFIEL, *Assistant Examiner.*